(12) United States Patent
Spatafora (10) Patent No.: US 7,011,203 B2
(45) Date of Patent: Mar. 14, 2006

(54) METHOD AND UNIT FOR CONTROLLING A VARIABLE-CAPACITY STORE

(75) Inventor: Mario Spatafora, Granarolo (IT)

(73) Assignee: G.D Societa' Per Azioni, Bologna (IT)

( * ) Notice: Subject to any disclaimer, the term of this patent is extended or adjusted under 35 U.S.C. 154(b) by 0 days.

(21) Appl. No.: 10/965,001

(22) Filed: Oct. 14, 2004

(65) Prior Publication Data
US 2005/0092579 A1 May 5, 2005

(30) Foreign Application Priority Data
Oct. 23, 2003 (IT) .......................... BO2003A0628

(51) Int. Cl.
B65G 1/00 (2006.01)
(52) U.S. Cl. .................... 198/347.1; 198/575; 198/812
(58) Field of Classification Search ............ 198/347.1, 198/347.3, 575, 588, 812, 572
See application file for complete search history.

(56) References Cited

U.S. PATENT DOCUMENTS

| | | | | |
|---|---|---|---|---|
| 3,426,885 A | * | 2/1969 | Rupert ..................... | 198/347.1 |
| 3,655,024 A | * | 4/1972 | Horn ........................ | 198/578 |
| 5,103,960 A | * | 4/1992 | Brown et al. ............ | 198/347.1 |
| 5,322,154 A | * | 6/1994 | Lenherr .................... | 198/812 |
| 5,413,213 A | | 5/1995 | Golz et al. | |
| 5,696,689 A | * | 12/1997 | Okumura et al. ........ | 198/347.1 |
| 6,725,997 B1 | * | 4/2004 | Draghetti ................. | 198/347.1 |

FOREIGN PATENT DOCUMENTS

| | | |
|---|---|---|
| EP | 0738478 | 10/1996 |
| JP | 5-32315 | * 2/1993 |
| JP | 5-262423 | * 10/1993 |
| WO | 99/44446 | 9/1999 |
| WO | 02/085144 | 10/2002 |
| WO | 03/026988 | 4/2003 |

OTHER PUBLICATIONS

Patent Abstract of Japan of JP 63149083 dated Jun. 21, 1988.

* cited by examiner

*Primary Examiner*—James R. Bidwell
(74) *Attorney, Agent, or Firm*—Ladas and Parry LLP (57) ABSTRACT

A method and unit for controlling a variable-capacity store, which has a first conveyor in the form of an endless belt having a conveying branch and a return branch of respective lengths variable in complementary manner, and a first and second actuating device; the conveying branch is connected to a second conveyor at an input station, and to a third conveyor at an output station; the first actuating device is controlled solely as a function of the status of the second conveyor, and the second actuating device is controlled as a function of the status of the third conveyor and as a function of the status of the first actuating device; the status of the first actuating device, the status of the second actuating device, and the status of the third conveyor are determined by respective encoders; and the second actuating device is feedback position controlled by means of a control unit to which the encoders are connected.

21 Claims, 5 Drawing Sheets

METHOD AND UNIT FOR CONTROLLING A VARIABLE-CAPACITY STORE

The present invention relates to a method and unit for controlling a variable-capacity store.

The present invention may be used to advantage in a variable-capacity store for cigarettes, to which the following description refers purely by way of example.

BACKGROUND OF THE INVENTION

In cigarette packing, a variable-capacity cigarette store is interposed between a cigarette manufacturing machine and a packing machine to compensate for any difference between the number of cigarettes produced and the number of cigarettes packed.

One example of a FIFO (First In First Out) variable-capacity cigarette store is described in Patent EP-0738478-B1, U.S. Pat. No. 5,413,213-A1, Patent Application WO-9944446-A1, Patent Application WO-02085144-A1, and Patent Application WO-03026988-A1. A store of the type described in the above documents comprises an input station and an output station arranged in series along a cigarette feed path; an endless conveyor belt having a conveying branch and a return branch; and an adjusting device for adjusting the lengths of the conveying and return branches in complementary manner. The conveyor belt is driven by at least one electric motor to feed the cigarettes along the conveying branch, and engages a series of fixed guides for keeping the conveyor belt in the desired position. The conveying branch of the store receives a stream of cigarettes from an output conveyor of a manufacturing machine, connected to the input station of the store, and supplies a stream of cigarettes to an input conveyor of a packing machine, connected to the output station of the store.

In Patent Application WO-02085144-A1, the store conveyor belt is driven by an electric motor, connected to a return pulley of the conveying branch at the output station, to run the store conveyor belt at exactly the same travelling speed as the packing machine input conveyor; and the adjusting device of the store comprises its own electric motor, which is operated by a central control unit to adjust the lengths of the conveying and return branches in complementary manner. More specifically, the electric motor of the adjusting device is controlled by the central control unit as a function of an error signal proportional to the difference between the rotation speed of a return pulley of the conveying branch at the input station, and the rotation speed of a return pulley of the manufacturing machine output conveyor at the input station.

In Patent Application WO-03026988-A1, the store conveyor belt is driven by a first electric motor, connected to a return pulley of the conveying branch at the output station, to run the store conveyor belt at exactly the same travelling speed as the manufacturing machine output conveyor, and by a second electric motor, connected to a return pulley of the conveying branch at the output station, to run the store conveyor belt at exactly the same travelling speed as the packing machine input conveyor; the adjusting device of the store comprises a freely-running carriage; and, as opposed to being adjusted by a specific motor, the lengths of the conveying and return branches are adjusted in complementary manner by the first and second electric motor simply tensioning the store conveyor belt.

Though ensuring correct operation of the store, both the control systems described above fail to provide for optimum performance in terms of speed and accuracy.

SUMMARY OF THE INVENTION

It is an object of the present invention to provide a method and unit for controlling a variable-capacity store, designed to eliminate the aforementioned drawbacks, and which in particular are cheap and easy to implement.

According to the present invention, there is provided a method of controlling a variable-capacity store comprising a first conveyor in the form of an endless belt having a conveying branch and a return branch; adjusting means for adjusting the lengths of the conveying branch and the return branch in complementary manner; and actuating means comprising a first actuating device and a second actuating device; the conveying branch being connected to a second conveyor at an input station, and to a third conveyor at an output station; the control method controlling the first actuating device as a function of a status of the second conveyor, and controlling the second actuating device as a function of a status of the third conveyor; and the method being characterized by controlling the first actuating device solely as a function of the status of the second conveyor, and controlling the second actuating device as a function of the status of the third conveyor and as a function of the status of the first actuating device.

According to the present invention, there is provided a unit for controlling a variable-capacity store comprising a first conveyor in the form of an endless belt having a conveying branch and a return branch; adjusting means for adjusting the lengths of the conveying branch and the return branch in complementary manner; and actuating means comprising a first actuating device and a second actuating device; the conveying branch being connected to a second conveyor at an input station, and to a third conveyor at an output station; the control unit comprising first control means for controlling the first actuating device as a function of a status of the second conveyor, and second control means for controlling the second actuating device as a function of a status of the third conveyor; and the control unit being characterized in that the first control means control the first actuating device solely as a function of the status of the second conveyor, and the second control means control the second actuating device as a function of the status of the third conveyor and as a function of the status of the first actuating device.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figures 1, 2:
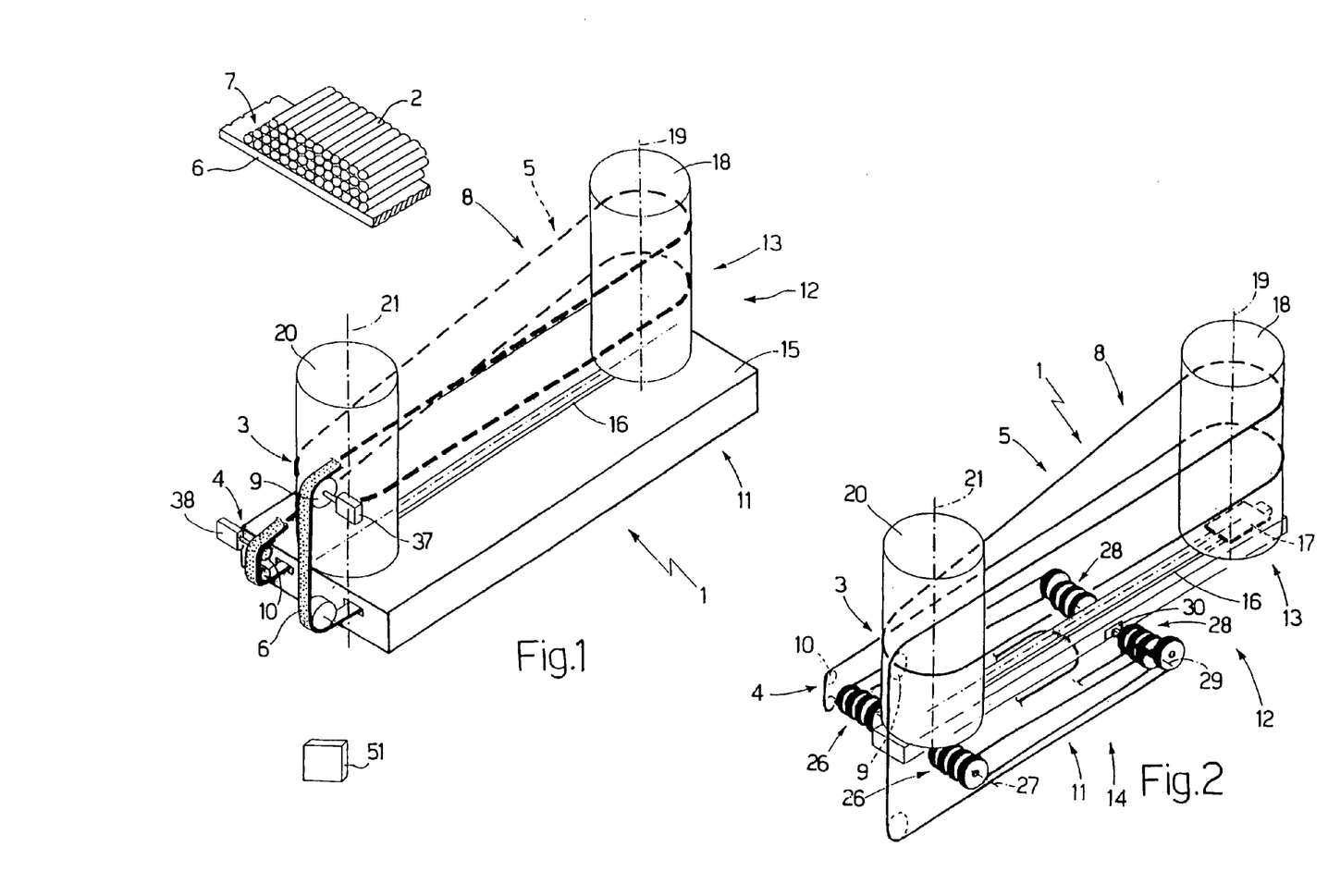
FIG. 1 shows a schematic view in perspective of a variable-capacity cigarette store featuring the control unit according to the present invention.
FIG. 2 shows a view in perspective, with parts removed for clarity, of the FIG. 1 store.

Number 1 in FIG. 1 indicates as a whole a variable-capacity store for cigarettes 2, comprising an input station 3 and an output station 4 for cigarettes 2. Input station 3 and output station 4 are arranged in series along a feed path of cigarettes 2. More specifically, store 1 is a FIFO-type variable-capacity cigarette store, i.e. for storing a number of cigarettes 2 varying as required within a given range, and in which the first cigarettes 2 entering store 1 at input station 3 are the first to be supplied to output station 4. In actual use, store 1 receives a mass of cigarettes 2, arranged in bulk in a continuous stream, at input station 3, and feeds cigarettes 2 to output station 4.

Store 1 comprises an endless conveyor 5 defined by an endless belt 6 having a substantially rectangular section, and two opposite major lateral surfaces, one of which is a conveying surface 7 for supporting cigarettes 2 as they are fed through store 1. Conveyor 5 comprises a conveying branch 8 which, together with input and output conveyors, defines the feed path for cigarettes 2 between a manufacturing machine and a packing machine, extends from an input pulley 9 at input station 3 to an output pulley 10 at output station 4, and feeds cigarettes 2 from input station 3 to output station 4. Conveyor 5 also comprises a return branch 11 extending from output pulley 10 to input pulley 9.

Store 1 comprises an adjusting assembly 12 for adjusting the length of conveying branch 8 and the length of return branch 11 in complementary manner, so as to adjust the storage capacity of store 1, and which comprises an adjusting device 13 associated with conveying branch 8, and a compensating device 14 associated with return branch 11.

Adjusting device 13 comprises a fixed frame defined by a parallelepiped-shaped box body 15, the top surface of which has a straight guide 16 extending between input station 3 and output station 4, and on which runs a slide 17 supporting a movable drum 18 with a vertical axis 19. Straight guide 16 also supports a fixed drum 20 which is connected rigidly to straight guide 16, has a vertical axis 21, and is located close to input station 3.

Figure 4:
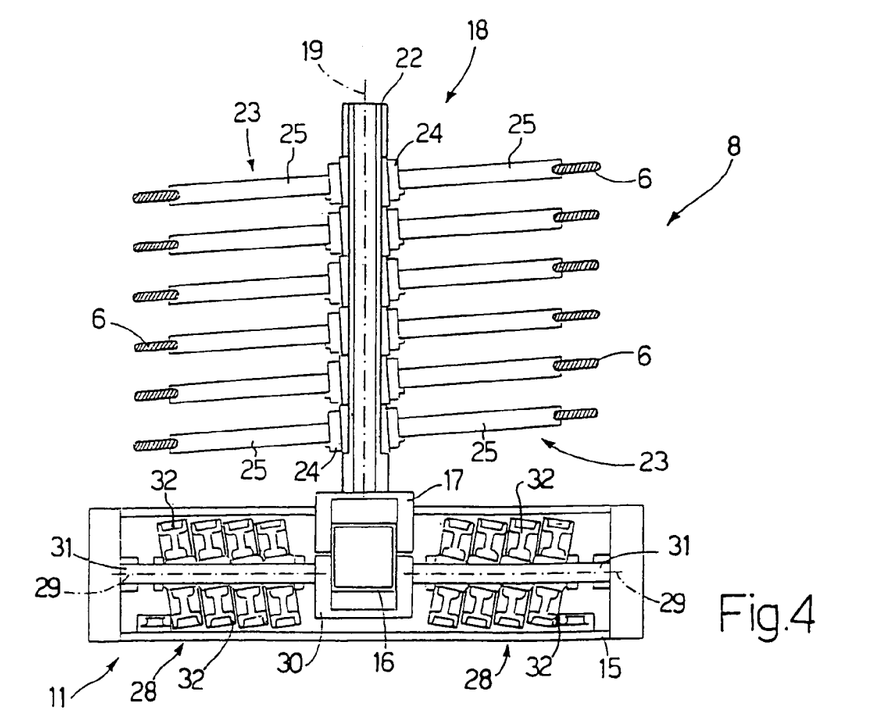
FIG. 4 shows a larger-scale front section of the FIG. 1 store.

As shown in FIG. 4, each drum 18, 20 comprises a vertical, angularly fixed, central shaft 22, on which are equally spaced a number of pulleys 23; and each pulley 23 comprises a central hub 24 fitted idly and in an axially fixed position to shaft 22, and an outer rim 25 coaxial with shaft 22 and relative hub 24, and supporting belt 6.

Compensating device 14 is housed entirely inside box body 15 underneath adjusting device 13. More specifically, as shown in FIG. 2, compensating device 14 comprises two fixed, coaxial drums 26 having respective horizontal axes 27 and connected rigidly to guide 16 at fixed drum 20; and two movable, coaxial drums 28 having respective horizontal axes 29 and mounted on a slide 30 running along a bottom portion of guide 16. More specifically, straight guide 16 is defined by a square-section beam (shown more clearly in FIG. 4), a top portion of which supports drum 20 and, by means of slide 17, drum 18, and a bottom portion of which supports fixed drums 26 and, by means of slide 30, movable drums 28.

Figure 3:
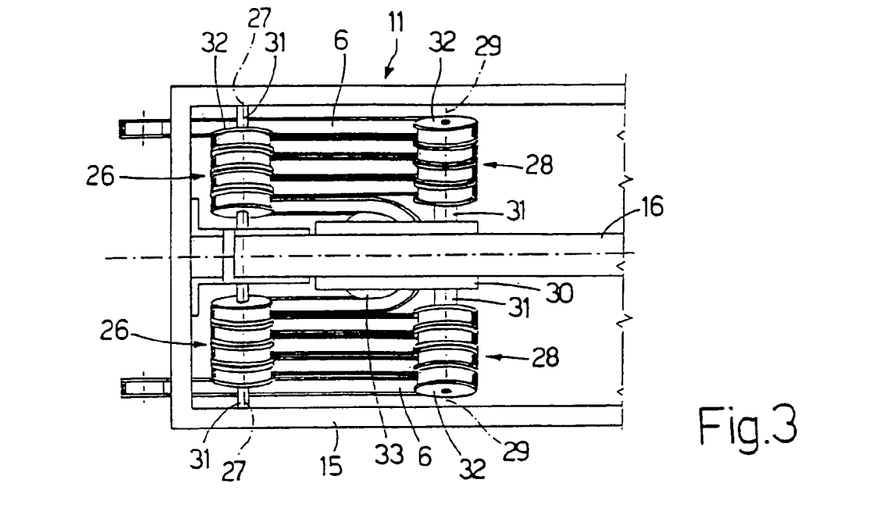
FIG. 3 shows a larger-scale plan view of a detail of the FIG. 1 store.

As shown in FIGS. 3 and 4, drums 26 and 28 are located on opposite sides of guide 16, so that respective axes 27 and 29 are perpendicular to guide 16; and each drum 26, 28 comprises a respective shaft 31, and a number of pulleys 32, which are equally spaced along shaft 31, are fitted idly to shaft 31, and have respective outer grooves of a width approximately equal to but no smaller than the width of belt 6. In addition to the two movable drums 28, slide 30 also supports a pulley 33, which is fitted idly astride guide 16 to rotate freely about a vertical axis, and permits passage of belt 6 from the movable drum 28 on one side of guide 16 to the movable drum 28 on the other side of guide 16. More specifically, passage of belt 6 from the movable drum 28 on one side of guide 16 to the movable drum 28 on the other side of guide 16 is made possible by belt 6 winding on edge about pulley 33.

Figure 5:
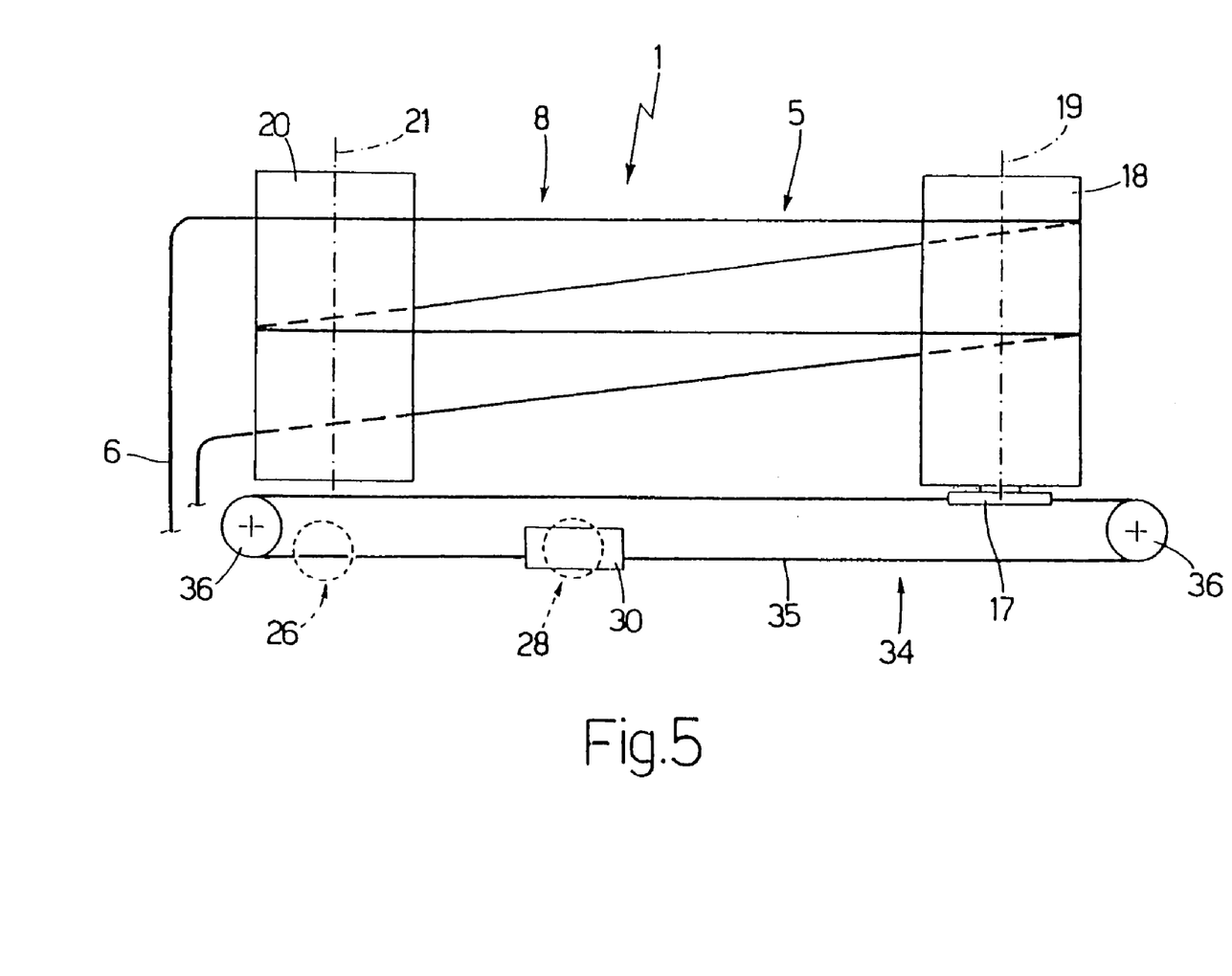
FIG. 5 shows a side view, with further parts removed for clarity, of the FIG. 1 store.

As shown in FIG. 5, slide 17 supporting movable drum 18, and slide 30 supporting movable drums 28 are connected mechanically to each other by a connecting device 34 designed so that each movement of slide 17 corresponds to an identical movement of slide 30 in the opposite direction. More specifically, connecting device 34 comprises an endless belt 35 looped about two end pulleys 36 fitted idly to box body 15 to rotate freely about respective horizontal axes; and slides 17 and 30 are connected mechanically to belt 35 so that each movement of slide 17 corresponds to an identical movement of slide 30 in the opposite direction.

As shown in FIG. 1, input pulley 9 is rotated by an actuating device 37 about a respective horizontal axis to drive belt 6 at input station 3, and output pulley 10 is rotated about a respective horizontal axis by an actuating device 38, substantially identical with actuating device 37, to drive belt 6 at output station 4.

Along conveying branch 8 of conveyor 5, belt 6 winds downwards about both drums 18 and 20 to form a vertical coil, each turn of which is supported by two corresponding pulleys 23. Along conveying branch 8, belt 6 is positioned with conveying surface 7 facing upwards, and, along the coil, is positioned on edge with respect to drums 18 and 20, and rests flat on rims 25 of pulleys 23. Along return branch 11 of conveyor 5, belt 6 winds about drums 26 and 28 to form a horizontal coil, each turn of which is supported by two corresponding pulleys 32.

In actual use, cigarettes 2 are fed continuously onto conveying branch 8 of conveyor 5 at input station 3, and are fed by conveying branch 8 to output station 4 where the first cigarettes into store 1 are fed out of store 1.

In normal operating conditions, the number of cigarettes 2 fed to input station 3 equals the number of cigarettes 2 leaving output station 4 of conveyor 5, so that actuating device 37 at input station 3 drives belt 6 at the same speed as actuating device 38 at output station 4, and the distance between drums 18 and 20 is unchanged.

In the event more cigarettes 2 are fed to input station 3 than are absorbed at output station 4, actuating device 37 at input station 3 drives belt 6 faster than actuating device 38 at output station 4, so that movable drum 18 moves away from fixed drum 20, thus increasing the length of conveying branch 8; and, to compensate for the increase in the length of conveying branch 8, movable drums 28 move towards fixed drums 26 to make a complementary reduction in the length of return branch 11. In other words, in the event more cigarettes 2 are fed to input station 3 than are absorbed at output station 4, input pulley 9 drives belt 6 faster than output pulley 10, so that movable drums 28 mounted on slide 30 are drawn towards fixed drums 26, thus reducing the length of return branch 11; and, by virtue of connecting device 34, movement of slide 30 corresponds to an equal movement in the opposite direction of slide 17, which increases the distance between movable drum 18 and fixed drum 20, thus increasing the length of conveying branch 8 to compensate for the reduction in the length of return branch 11.

Conversely, when fewer cigarettes 2 are fed to input station 3 than are absorbed at output station 4, actuating device 37 at input station 3 drives belt 6 at a slower speed than actuating device 38 at output station 4, so that movable drum 18 moves towards fixed drum 20, thus reducing the length of conveying branch 8; and, to compensate for the reduction in the length of conveying branch 8, movable drums 28 move away from fixed drums 26 to make a complementary increase in the length of return branch 11. In other words, when fewer cigarettes 2 are fed to input station 3 than are absorbed at output station 4, input pulley 9 drives belt 6 at a slower speed than output pulley 10, so that movable drum 18 mounted on slide 17 is drawn towards fixed drum 20, thus reducing the length of conveying branch 8; and, by virtue of connecting device 34, movement of slide 17 corresponds to an equal movement in the opposite direction of slide 30, which increases the distance between fixed drums 26 and movable drums 28, thus increasing the length of return branch 11 to compensate for the reduction in the length of conveying branch 8.

It should be pointed out that the lengths of conveying branch 8 and return branch 11 are adjusted by simply tensioning belt 6 by means of actuating device 37 connected to input pulley 9, and actuating device 38 connected to output pulley 10. Since the function of connecting device 34, of relating the movement of movable drum 18 (slide 17) to that of movable drums 28 (slide 30), would anyway be performed automatically, in the event of a difference in speed between input pulley 9 and output pulley 10, by virtue of the structure of conveyor 5, connecting device 34 provides solely for making the connection between the movement of movable drum 18 and that of movable drums 28 easier, and is therefore optional.

Figure 6:
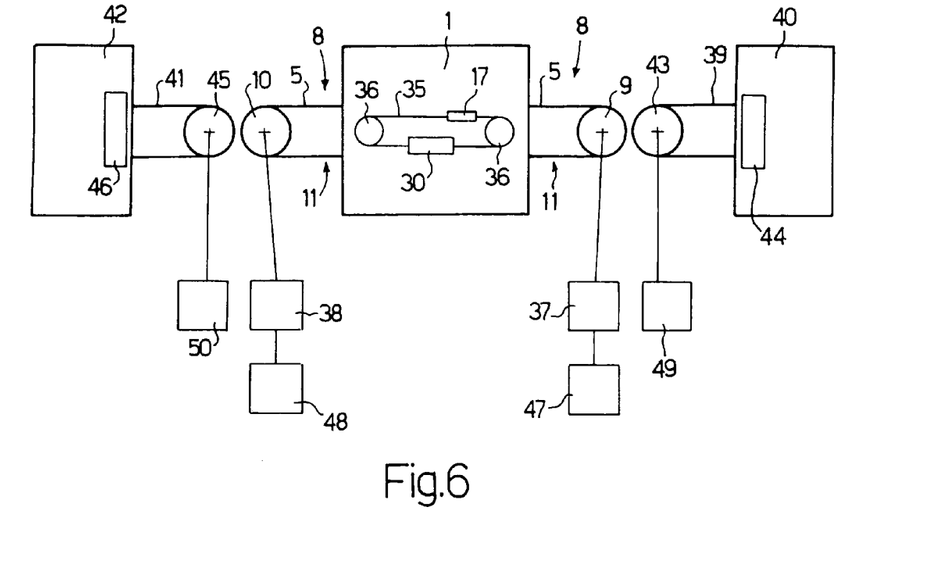
FIG. 6 shows a schematic view of the FIG. 1 store interposed between a cigarette manufacturing machine and a cigarette packing machine.

As shown in FIG. 6, input station 3 of store 1 is connected to an output conveyor 39 of a cigarette manufacturing machine 40, and output station 4 of store 1 is connected to an input conveyor 41 of a cigarette packing machine 42. Output conveyor 39 of manufacturing machine 40 has a return pulley 43 rotated by an actuating device 44 and facing input pulley 9 of conveying branch 8 of conveyor 5, which input pulley 9, as stated, is rotated by actuating device 37; and input conveyor 41 of packing machine 42 has a return pulley 45 rotated by an actuating device 46 and facing output pulley 10 of conveying branch 8 of conveyor 5, which output pulley 10, as stated, is rotated by actuating device 38.

Input pulley 9 of conveying branch 8 is associated with a sensor 47 (in particular, an angular encoder) for giving the angular position of input pulley 9; output pulley 10 of conveying branch 8 is associated with a sensor 48 (in particular, an angular encoder) for giving the angular position of output pulley 10; return pulley 43 of output conveyor 39 of manufacturing machine 40 is associated with a sensor 49 (in particular, an angular encoder) for giving the angular position of return pulley 43; and return pulley 45 of input conveyor 41 of packing machine 42 is associated with a sensor 50 (in particular, an angular encoder) for giving the angular position of return pulley 45.

In actual use, actuating device 44 of output conveyor 39 of manufacturing machine 40 is controlled by a control unit (not shown) of manufacturing machine 40; actuating device 46 of input conveyor 41 of packing machine 42 is controlled by a control unit (not shown) of packing machine 42; and actuating devices 37 and 38 of conveyor 5 of store 1 are controlled by a control unit 51 of store 1.

Figure 7:
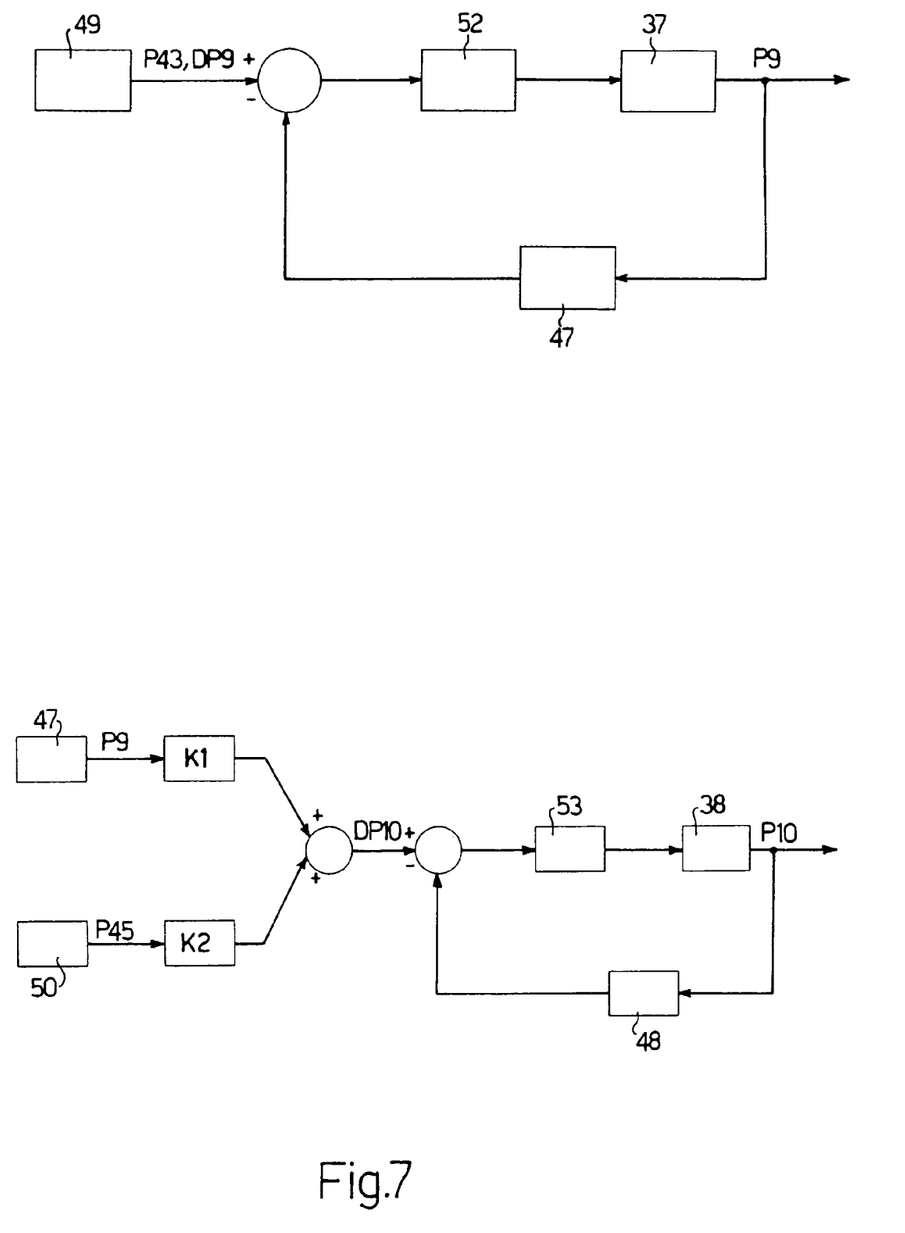
FIG. 7 shows a block diagram of a control strategy employed by the control unit of the FIG. 6 store.

As shown in FIG. 7, actuating device 37 of input pulley 9 is feedback-controlled so that input pulley 9 is synchronized with return pulley 43 of output conveyor 39 of manufacturing machine 40. In other words, the desired position value DP9 of input pulley 9 is assumed equal to the position value P43 of return pulley 43 as measured by sensor 49, so that input pulley 9 has the same angular position and therefore speed as return pulley 43 at all times. A PID adjuster 52 is preferably used in the feedback control chain of actuating device 37 to achieve a high degree of control performance in terms of both precision and response speed.

As also shown in FIG. 7, actuating device 38 of output pulley 10 is feedback-controlled using a desired position value DP10 of pulley 10, obtained by means of a linear combination of the position value P9 of input pulley 9 measured by sensor 47, and of the position value P45 of return pulley 45 measured by sensor 50. In other words, the desired position value DP10 of pulley 10 is obtained using the following equation, in which K1 and K2 are non-zero multiplication coefficients:

$$DP10=P9*K1+P45*K2 \qquad [1]$$

A PID adjuster 53 is preferably used in the feedback control chain of actuating device 38 to achieve a high degree of control performance in terms of both precision and response speed. The values of multiplication coefficients K1 and K2 are determined as a function of the construction specifications of store 1, as a function of the performance of actuating devices 37 and 38, and as a function of the characteristics of manufacturing machine 40 and packing machine 42, and are first determined by theoretical analysis of the system, and then corrected on the basis of tests.

In a preferred embodiment, the values of multiplication coefficients K1 and K2 are constant, and, in an alternative embodiment, vary as a function of the extent to which store 1 is filled. The values of multiplication coefficients K1 and K2 normally range between 0 and 1; and the value of multiplication coefficient K1 is normally lower than the value of multiplication coefficient K2, so that position value P45 of return pulley 45 contributes more than position value P9 of input pulley 9 to the desired position value DP10 of pulley 10.

Figure 8:
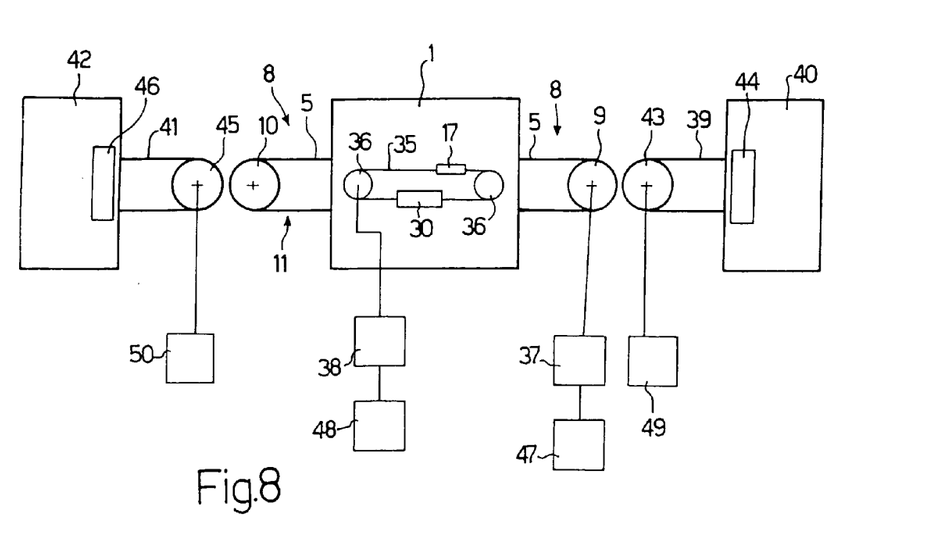
FIG. 8 shows a schematic view of a different embodiment of the FIG. 1 store interposed between a cigarette manufacturing machine and a cigarette packing machine.

FIG. 8 shows an alternative embodiment of the FIG. 1 store, in which output pulley 10 is mounted idly, actuating device 38 is connected to one of pulleys 36 to power belt 35 and therefore the combined movement of slides 17 and 30, and sensor 48 obviously gives the angular position of the powered pulley 36, as opposed to the position of output pulley 10. The control strategy of the FIG. 8 store is substantially identical with that of the FIG. 6 store, the only difference being that of controlling the position of the powered pulley 36 as opposed to the position of output pulley 10. Actuating device 38 of powered pulley 36 is therefore feedback-controlled using a desired position value DP36 of powered pulley 36, obtained by means of a linear combination of the position value P9 of input pulley 9 measured by sensor 47, and of the position value P45 of return pulley 45 measured by sensor 50. In other words, the desired position value DP36 of powered pulley 36 is obtained by means of the following equation, in which K1 and K2 are numerical non-zero multiplication constants:

$$DP36 = P9*K1 + P45*K2 \quad [2]$$

It should be pointed out that, though the above control strategies are based on the angular position of pulleys 9, 10 (or 36), 43, 45, the same control logic also applies to the angular speeds of pulleys 9, 10 (or 36), 43, 45. In fact, time derivation of angular-position-based equations [1] and [2] gives equivalent angular-speed-based equations. It should also be pointed out that, since position value P9 of input pulley 9 substantially coincides with position value P43 of return pulley 43, position value P9 of input pulley 9 may be replaced by position value P43 of return pulley 43 in the above control strategies, and particularly in equations [1] and [2].

Tests have shown that control unit 51 of store 1 as described above provides for optimum performance in terms of speed and precision, as compared with known control units.

Obviously, store 1 as described above may be used for storing other than cigarettes 2, e.g. filter portions, packets of cigarettes, confectionary, or semifinished parts used in manufacturing or metalworking industries.

The invention claimed is:

1. A method of controlling a variable-capacity store (1) comprising a first conveyor (5) in the form of an endless belt having a conveying branch (8) and a return branch (11); adjusting means (12) for adjusting the lengths of the conveying branch (8) and the return branch (11) in complementary manner; and actuating means (37, 38) comprising a first actuating device (37) and a second actuating device (38); the conveying branch (8) being connected to a second conveyor (39) at an input station (3), and to a third conveyor (41) at an output station (4); the control method controlling the first actuating device (37) as a function of a status of the second conveyor (39), and controlling the second actuating device (38) as a function of a status of the third conveyor (41); and the method being characterized by controlling the first actuating device (37) solely as a function of the status of the second conveyor (39), and controlling the second actuating device (38) as a function of the status of the third conveyor (41) and as a function of the status of the first actuating device (37).

2. A method as claimed in claim 1, wherein the first actuating device (37) rotates a first pulley (9) of the first conveyor (5), located at the input station (3); and the second actuating device (38) rotates a second pulley (10) of the first conveyor (5), located at the output station (4).

3. A method as claimed in claim 1, wherein the conveying branch (8) of the first conveyor (5) is wound between two supporting members (18, 20) movable with respect to each other to vary the length of the conveying branch (8); the first actuating device (37) rotating a first pulley (9) of the first conveyor (5), located at the input station (3); and the second actuating device (38) adjusting a distance between the movable supporting members (18, 20) of the conveying branch (8).

4. A method as claimed in claim 1, wherein a first signal (P43) is picked up relative to the position of the second conveyor (39), and the first actuating device (37) is controlled using the first signal (P43) as a control quantity, so that the position of the first actuating device (37) is synchronized with the position of the second conveyor (39).

5. A method as claimed in claim 1, wherein a second signal (P45) is picked up relative to the position of the third conveyor (41), a third signal (P9) is picked up relative to the position of the first actuating device (37), and the second actuating device (38) is controlled as a function of the second signal (P45) and the third signal (P9).

6. A method as claimed in claim 5, wherein a fourth signal (DP10) is determined by means of a linear combination of the second signal (P45) and third signal (P9); the second actuating device (38) being controlled using the fourth signal (DP10) as a control quantity.

7. A method as claimed in claim 6, wherein the coefficients (K1, K2) of the linear combination of the second signal (P45) and third signal (P9) are constant.

8. A method as claimed in claim 6, wherein the coefficients (K1, K2) of the linear combination of the second signal (P45) and third signal (P9) are variable.

9. A method as claimed in claim 8, wherein the coefficients (K1, K2) of the linear combination of the second signal (P45) and third signal (P9) are variable as a function of the operating status of the store (1).

10. A method as claimed in claim 9, wherein the coefficients (K1, K2) of the linear combination of the second signal (P45) and third signal (P9) are variable as a function of the extent to which the store (1) is filled.

11. A method as claimed in claim 1, wherein said status of the conveyors (5, 39, 41) and of the actuating devices (37, 38), which is used for control, is a position.

12. A method as claimed in claim 1, wherein said status of the conveyors (5, 39, 41) and of the actuating devices (37, 38), which is used for control, is a speed.

13. A method as claimed in claim 1, wherein the first actuating device (37) and the second actuating device (38) are feedback-controlled by means of a closed control loop.

14. A method as claimed in claim 1, wherein the conveying branch (8) forms at least one first coil about at least one pair of first drums (18, 20), and the return branch (11) forms at least one second coil about at least one pair of second drums (26, 28) perpendicular to the first drums (18, 20).

15. A control unit (51) for controlling a variable-capacity store (1) comprising a first conveyor (5) in the form of an endless belt having a conveying branch (8) and a return branch (11); adjusting means (12) for adjusting the lengths of the conveying branch (8) and the return branch (11) in complementary manner; and actuating means (37, 38) comprising a first actuating device (37) and a second actuating device (38); the conveying branch (8) being connected to a second conveyor (39) at an input station (3), and to a third conveyor (41) at an output station (4); the control unit (51) comprising first control means (52) for controlling the first actuating device (37) as a function of a status of the second conveyor (39), and second control means (53) for controlling the second actuating device (38) as a function of a status of the third conveyor (41); and the control unit (51) being characterized in that the first control means (52) control the first actuating device (37) solely as a function of the status of the second conveyor (39), and the second control means (53) control the second actuating device (38) as a function of the status of the third conveyor (41) and as a function of the status of the first actuating device (37).

16. A unit as claimed in claim 15, wherein the first actuating device (37) rotates a first pulley (9) of the first conveyor (5), located at the input station (3); and the second actuating device (38) rotates a second pulley (10) of the first conveyor (5), located at the output station (4).

17. A unit as claimed in claim 15, wherein the conveying branch (8) of the first conveyor (5) is wound between two supporting members (18, 20) movable with respect to each other to vary the length of the conveying branch (8); the first actuating device (37) rotating a first pulley (9) of the first conveyor (5), located at the input station (3); and the second actuating device (38) adjusting a distance between the movable supporting members (18, 20) of the conveying branch (8).

18. A unit as claimed in claim 15, and comprising a first sensor (49) for picking up a first signal (P43) relative to the position of the second conveyor (39); the first control means (52) controlling the first actuating device (37) using the first signal (P43) as a control quantity, so that the position of the first actuating device (37) is synchronized with the position of the second conveyor (39).

19. A unit as claimed in claim 15, and comprising a second sensor (50) for picking up a second signal (P45) relative to the position of the third conveyor (41), and a third sensor (47) for picking up a third signal (P9) relative to the position of the first actuating device (37); the second control means (53) controlling the second actuating device (38) as a function of the second signal (P45) and the third signal (P9).

20. A unit as claimed in claim 19, and comprising computing means for determining a fourth signal (DP10) by means of a linear combination of the second signal (P45) and third signal (P9); the second control means (53) controlling the second actuating device (38) using the fourth signal (DP10) as a control quantity.

21. A unit as claimed in claim 15, wherein the conveying branch (8) forms at least one first coil about at least one pair of first drums (18, 20), and the return branch (11) forms at least one second coil about at least one pair of second drums (26, 28) perpendicular to the first drums (18, 20).

* * * * *